United States Patent

Crawford et al.

Patent Number: 5,862,310
Date of Patent: Jan. 19, 1999

[54] DATA FORMATTING SYSTEM

[75] Inventors: Dwayne B. Crawford, Cincinnati, Ohio; Razvan Gabriel Herdea, Indianapolis, Ind.

[73] Assignee: Becton Dickinson and Company, Franklin Lakes, N.J.

[21] Appl. No.: 700,899

[22] Filed: Aug. 21, 1996

[51] Int. Cl.⁶ ................................................. G06K 15/00
[52] U.S. Cl. ........................................... 395/117; 395/114
[58] Field of Search ................................. 395/101, 112, 395/113, 114, 115, 116, 828, 830, 832, 842, 843, 872, 892, 893, 894; 358/404, 444; 707/522, 523, 524

[56] References Cited

U.S. PATENT DOCUMENTS

| | | |
|---|---|---|
| 4,223,183 | 9/1980 | Peters, Jr. . |
| 4,481,574 | 11/1984 | DeFino et al. . |
| 4,630,067 | 12/1986 | Teraoka . |
| 4,779,105 | 10/1988 | Thomson et al. . |
| 4,875,174 | 10/1989 | Olodort et al. . |
| 4,935,870 | 6/1990 | Burk, Jr. et al. . |
| 5,146,544 | 9/1992 | Altham et al. . |
| 5,195,130 | 3/1993 | Weiss et al. . |
| 5,239,621 | 8/1993 | Brown, III et al. ............. 395/115 |
| 5,387,783 | 2/1995 | Mihm et al. . |
| 5,402,528 | 3/1995 | Christopher et al. . |
| 5,465,106 | 11/1995 | Keech et al. . |
| 5,481,742 | 1/1996 | Worley et al. . |
| 5,497,450 | 3/1996 | Helmbold et al. . |
| 5,533,176 | 7/1996 | Best et al. ............................. 395/117 |

OTHER PUBLICATIONS

MedPlus 1400 Thermal Printer Marketing Brochure, 1993.
MedPlus Model 1400 Bar Code Label Operations Manual, 1992.

Primary Examiner—Arthur G. Evans
Attorney, Agent, or Firm—Eric M. Lee

[57] ABSTRACT

A data formatting system for formatting an unformatted data stream, and communicating the formatted data stream and a format to a printer output device. The data formatting system includes a format generator which enables user design and creation of formats for downloading to the printer interface apparatus. Newly designed formats can then be utilized with subsequent unformatted data streams to create output images on an output device.

21 Claims, 9 Drawing Sheets

DATA FORMATTING SYSTEM

TECHNICAL FIELD

The present invention relates generally to a system which provides the capability to format a data stream from a computer, and is particularly directed to a data formatting system which includes a printer interface apparatus which accepts an unformatted data stream, formats the data stream, selects a format stored in a memory within the printer interface apparatus, and sends the format and the formatted data stream to an output device for printing. The printer interface apparatus, according to this invention, can be coupled to a plurality of computers, each of which can communicate to the printer interface apparatus an unformatted data stream. The printer interface apparatus can determine from the data stream which of the plurality of computers sent the unformatted data stream, and can select a particular group of formats from a memory as a function of the source computer. The data formatting system also includes a format generator apparatus which allows a user to generate new formats for use with the printer interface apparatus. The new format can then be downloaded into the printer interface apparatus for use with a subsequent unformatted data stream.

BACKGROUND OF THE INVENTION

Bar code labels are being increasingly utilized, at least in part because of their ability to transfer data from one data processing system to another quickly and reliably. In industries which use many different types of data processing systems, generating a bar code label from one type of data processing system that can be read by another type of data processing system can be problematic. For example, in the health care industry, hospitals frequently have a variety of different laboratory information systems. These laboratory information systems contain data which can be printed onto a bar code label for use with bar code-capable hospital equipment, such as hematology and chemistry analyzers. Unfortunately, laboratory information systems are often proprietary systems, whose manufacturers either do not offer bar code generating software or printer drivers, or who may no longer even support the equipment. Many of these proprietary laboratory information systems do not have the capability to communicate with a bar code printer. Development of custom software to run on the laboratory information system can be expensive, if available at all, and necessary on-going support will be accordingly expensive.

In response to this problem, printers have been developed which can accept a stream of data from a predetermined host computer, such as a laboratory information system, and can format the steam of data for use with the printer. Such printers typically contain one or more formats for use with the data to generate one or more predetermined labels. While such printers eliminate the need to develop custom software for a proprietary host computer, any changes necessary to the instructions for formatting the stream of data, brought about for example because of a change in the host computer environment, requires installation of new circuitry. Of course, the printer is unavailable during the installation of such new circuitry. Similarly, if a new label format is desired, it is necessary to design, debug and install in the printer new circuitry containing the new format. This can require a significant amount of time and coordination between the printer user and the printer manufacturer. Finally, each printer is designed for use with a particular host computer, requiring separate printers for each host computer.

U.S. Pat. No. 5,402,528 discloses a printer capable of printing characters in various fonts and formats onto a web of records. The printer disclosed in the '528 patent contains a read-only memory in which software routines defining optional features or operations of the printer are stored. An alterable memory contains a table with information identifying each optional operation software routine as enabled or disabled. A processor in the printer can interface with an input device, such as keyboard or a computer, by which the table can be altered and, thus, the optional software routines enabled or disabled. The software instructions themselves cannot be altered without removing the read-only memory and installing a new read-only memory.

U.S. Pat. No. 5,481,742 discloses a printer control apparatus which includes a modem for receiving text data in an EBCDIC format, and a converter for converting the text data into an ASCII format. The conversion instructions are stored in an EEPROM memory and can be remotely programmed via the modem.

SUMMARY OF THE INVENTION

Accordingly, it is an object of the present invention to provide a data formatting system which includes a printer interface apparatus which can accept an unformatted stream of data from one of a plurality of different computers, identify which particular computer sent the stream of data, format the stream of data, select a format for use with the stream of data as a function of which computer sent the stream of data, and communicate the format and the formatted stream of data to a printer.

It is another object of the present invention to provide a printer interface apparatus for formatting a stream of unformatted data, the printer interface apparatus operative to be coupled to a format generator apparatus which is capable of downloading to the printer interface apparatus newly designed formats for use with the stream of data.

It is yet another object of this invention to provide a format generator apparatus for displaying an image of a format on a display device substantially as the format would generate an image on an output device, enabling user modification of data fields of the image, and generating a new format from the modified image which will generate an image on an output device substantially as the image was modified by the user.

It is still another object of this invention to provide a printer interface apparatus having a first memory wherein a plurality of groups of formats are stored within the first memory, the printer interface apparatus being capable of accepting a stream of data from a plurality of computers and operative to determine which of the plurality of computers sent the stream of data. The printer interface apparatus can determine which of the plurality of groups of formats is associated with the particular computer sending the stream of data and can select a format from the associated group of formats for use with an output device coupled to the printer interface apparatus.

It is still another object of this invention to provide a printer interface apparatus having an alterable programmable read only memory containing formatting instructions and formats, the printer interface apparatus having a modem to allow downloading of new instructions and/or formats remotely over a telephone line.

Additional objects, advantages and other novel features of the invention will be set forth in part in the description that follows and, in part, will become apparent to those skilled in the art upon examination of the invention. The objects and advantages of the invention may be realized and obtained by means of the instrumentalities and combinations particularly pointed out in the appended claims.

To achieve the foregoing and other objects and in accordance with the purposes of the present invention as described above, a data formatting system including a printer interface apparatus is provided for accepting from a computer an unformatted data stream, formatting the data stream, selecting a format from a memory within the printer interface apparatus, and sending the format and the formatted data to a printer for generation of a document such as a bar code label.

The printer interface apparatus according to the present invention has a microprocessor coupled to a first and second memory. The first memory contains instructions for formatting an unformatted stream of data sent to the printer interface apparatus by one of a plurality of host computers. The second memory contains therein at least one format for use with the formatted data stream. The printer interface apparatus can be coupled to a plurality of computers via a network interface card for example. The printer interface apparatus examines the unformatted data stream and determines which of the computers is the source of the data stream. After determining the source of the data stream, the printer interface apparatus is capable of determining the field layouts of the stream of data. The printer interface apparatus extracts from the unformatted data stream each data field and formats the data fields as required by the particular printer coupled to the printer interface apparatus.

The stream of data can indicate a particular format to use. The printer interface apparatus retrieves the specified format from the first memory. After formatting the stream of data, the printer interface apparatus forwards the selected format and the stream of formatted data to a printer coupled to the printer interface apparatus for image generation.

According to another embodiment of this invention, the first memory contains groups of formats, each group being associated with a different host computer. The microprocessor examines the stream of unformatted data and determines the source of the stream of data, and selects a format from the particular group of formats associated with that host computer. Thus, the printer interface apparatus according to this invention can be coupled to a plurality of host computers and apply separate formats particularly designed for a particular host computer, eliminating the need for purchasing and supporting separate printers for each host computer.

According to another embodiment of this invention, the first and second memory comprise an alterable programmable read only memory, such as an EEPROM. External signals can be received by the printer interface apparatus, from a modem or a computer coupled to the printer interface apparatus for example, to download new formats in the first memory and/or new formatting instructions in the second memory, without requiring physical manipulation of the printer interface apparatus and installation of a new memory. The printer interface apparatus can contain a modem to enable the downloading of formats and/or formatting instructions remotely over a telephone line. Thus, the printer interface apparatus can be supported from any location accessible by a telephone line. This greatly expedites resolution of problems at a user's site and greatly reduces the expense associated with fixing or modifying formats and/or formatting instructions.

According to another embodiment of this invention, a format generator apparatus is provided. The format generator apparatus can read a format and display an image generated from the format substantially as the image would look on an output device utilizing the same format. The format generator apparatus can enable user manipulation of fields of data on the image. For example, a user can move a particular field of data from one location on the image to another location on the image, or can increase the size of a particular data field, or can add or delete data fields. The format generator apparatus can generate a new format as a function of the modified image, the new format capable of being utilized by a printer interface apparatus for generating a document on an output device substantially identical to the manipulated image on the display device.

According to another embodiment of this invention, the format generator apparatus can be coupled to a printer interface apparatus and upon user request, send a format and a formatted stream of data to the printer interface apparatus and direct the printer interface apparatus to pass the format and the unformatted stream of data to an output device for printing. This enables a designer of a new format to verify that the output document has the appropriate appearance. The format generator apparatus can also communicate a format to a printer interface apparatus for storage in a memory of the printer interface apparatus. The printer interface apparatus can then utilize this format for use with subsequent streams of data received by the printer interface apparatus from a host computer. Thus, the current invention can provide a flexible format generation system capable of allowing users to design and implement new formats for use with host computer systems having no format generating capabilities.

Still other objects of the present invention will become apparent to those skilled in this art from the following description wherein there is shown and described a preferred embodiment of this invention, simply by way of illustration, of one of the best modes contemplated for carrying out the invention. As will be realized, the invention is capable of other different obvious aspects all without departing from the invention. Accordingly, the drawing and description will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings.

Reference will now be made in detail to the present preferred embodiment of the invention, an example of which is illustrated in the accompanying drawings, wherein like numerals indicate the same elements throughout the views.

DETAILED DESCRIPTION OF THE PREFERRED EMBODIMENT

Figure 1:
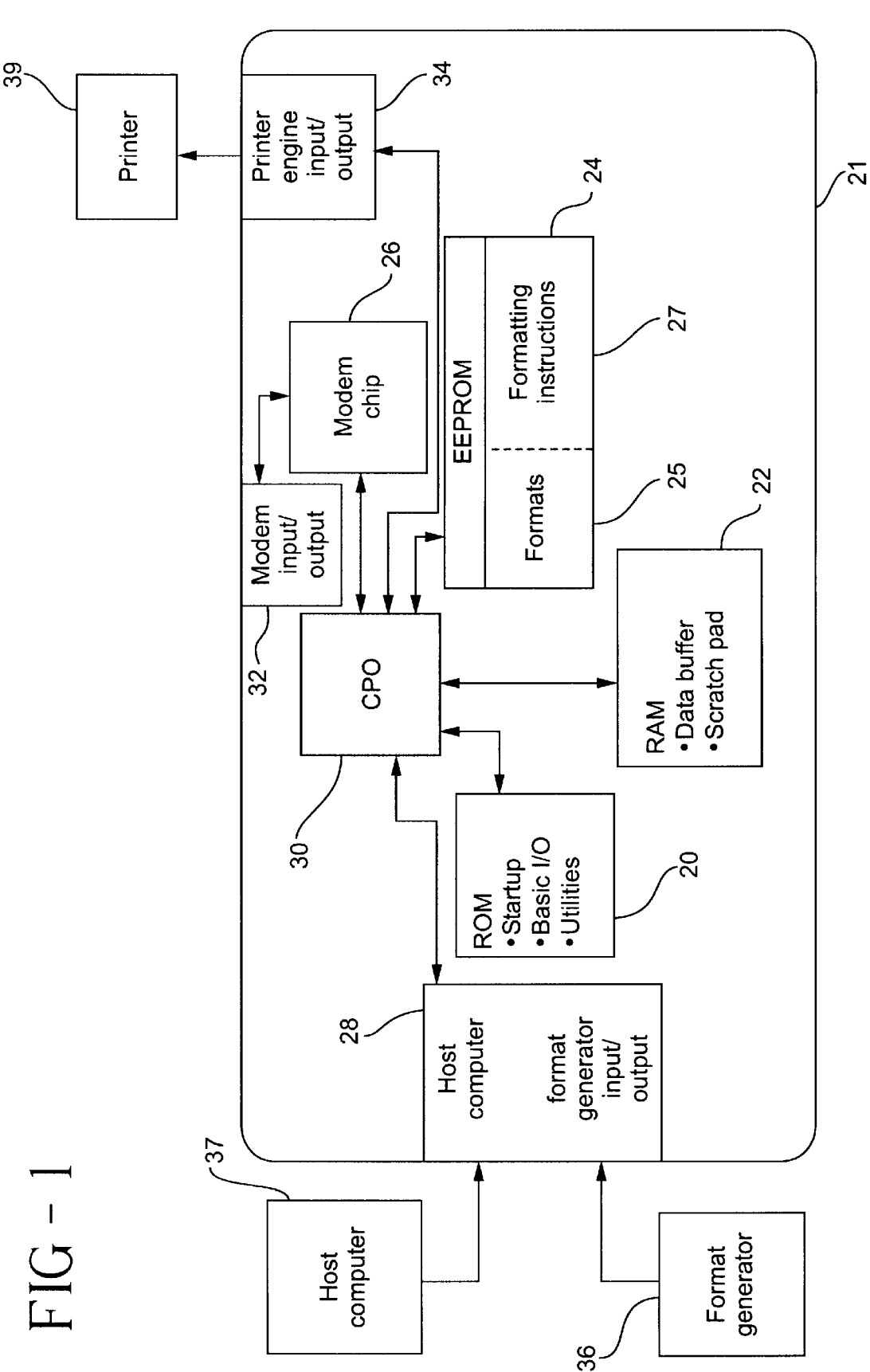
FIG. 1 is a block diagram of a printer interface apparatus according to one embodiment of this invention.

Referring now to the drawings, FIG. 1 shows a block diagram of printer interface apparatus 21 according to one embodiment of this invention. CPU 30 is coupled to first memory 25 which contains formats for defining an output image on an output device such as printer 39. CPU 30 can comprise any central processing unit known to those skilled in the art having sufficient power and flexibility to carry out the functionality described herein. CPU 30 is also coupled to second memory 27 which contains formatting instructions operative to format an unformatted data stream received from host computer 37. The phrase formatting instructions refers to the steps by which CPU 30 will be directed to format a stream of data received by printer interface apparatus 21. First memory 25 and second memory 27 can compose a single physical memory such as EEPROM 24, or can be separate memories.

CPU 30 accepts an unformatted data stream from host computer 37 via communications port 28. Communications port 28 can comprise a serial communications port or any other communications interface known to those skilled in the art. According to one embodiment of this invention, communications port 28 is coupled to a network adapter which in turn is coupled to a network. Thus, a plurality of network-attached computers can utilize printer interface apparatus 21 for generating documents such as labels on printer 39. The unformatted data stream sent by host computer 37 comprises a plurality of fields of data having either a predetermined length and/or a certain delimiter separating the fields of data in the data stream. CPU 30 processes the stream of unformatted data in accordance with the formatting instructions in second memory 27 and separates the individual data fields from the stream of data, eliminating any unnecessary or extraneous codes. CPU 30 pads the data fields with a sufficient number of spaces, if necessary, and appends appropriate control codes to the data fields such as a carriage return and/or a line feed, as required by printer 39. In this manner, CPU 30 formats the unformatted stream of data received from host computer 37. It is apparent that if the data field sent from host computer 37 were formatted precisely as required by the printer coupled to printer interface apparatus 21, minimal or even no formatting may be required.

A data field within the data stream can be used by CPU 30 to determine which of a plurality of formats stored in first memory 25 should be utilized with the stream of data. CPU 30 extracts from first memory 25 the requested format and communicates the format and the formatted stream of data to printer 39 to create an output image.

It is preferable that the formatting instructions in second memory 27 be developed with an understanding of the layout of the stream of unformatted data sent from host computer 37. This understanding can be obtained by either coordinating with the manufacturer of host computer 37 a particular layout of the data stream, or by manually examining streams of data from host computer 37 to determine the layout of the fields within the data stream. Appropriate formatting instructions can then be developed to format the unformatted stream of data into a condition acceptable for use by printer 39. Printer 39 can comprise any printer suitable for generating images on the particular medium desired. According to one embodiment of this invention, printer 39 is a bar code label printer. Manufacturers of such printers document the formatting codes required by the printer to create output images on the printer, and how each field of data communicated to the printer must be formatted. The use of the phrase formatting codes refers to the particular codes associated with a format used by an output device coupled to printer interface apparatus 21, such as printer 39, to generate an image.

CPU 30 is also coupled to ROM 20 which contains startup routines for CPU 30. Such startup routines can vary as a function of the particular CPU 30 utilized and typically handles such tasks as initializing memory and communication ports, and other general housekeeping tasks. ROM 20 also contains basic input/output routines for the various communication ports such as serial interface 28 used to communicate with host computer 37 and format generator 36, modem interface 32 used to communicate with a telephone line for remote access, and printer interface 34 used to communicate with an external printer. ROM 30 also contains control and response routines for modem chip 26, optional clock/timer control routines, printer engine control routines, storage and retrieval routines for EEPROM 24 and control routines for format generator 36.

CPU 30 is also coupled to RAM 22 which provides a temporary storage place for data transmitted or received from host computer 37 and printer interface 34, and provides a scratchpad function for manipulation of data.

CPU 30 preferably controls the receipt of data between host computer 37 and format generator 36 via an asynchronous serial communications interface such as serial interface 28. CPU 30 also controls the receipt and transmission of data between printer 39 via printer interface 34. CPU 30 also controls the receipt and transmission of data between an external telephone line and modem chip 26 via modem interface 32. CPU 30 can initiate or receive a telephone call between printer interface apparatus 21 and a remote location for long distance analysis of data streams communicated to printer interface apparatus 21 from host computer 37. Thus, an unformatted data stream sent from host computer 37 can be analyzed remotely via modem chip 26, and formatting instructions can be developed at the remote site for formatting the unformatted stream of data. The newly developed formatting instructions can then be communicated to CPU 30 over a telephone line via modem chip 26 and stored into second memory 27. This allows printer interface apparatus 21 to be modified remotely in a relatively expeditious manner to respond to either a change in an unformatted stream of data from host computer 37 or to respond to a new host computer 37 being coupled to printer interface apparatus 21 which is sending a stream of unformatted data unknown to printer interface apparatus 21. CPU 30 also enables transmission of formats from a remote location to first memory 25 via modem chip 26.

According to another embodiment of this invention, a computer coupled to printer interface apparatus 21 via serial interface 28 or modem interface 32 can communicate a control signal to CPU 30 requesting that CPU 30 transmit one or more formats from first memory 25, or formatting instructions from second memory 27 to the computer. A user of the computer can then analyze the formats or formatting instructions as they currently exist in printer interface apparatus 21.

Printer interface apparatus 21 can be coupled to format generator 36. CPU 30 responds to control commands communicated from format generator 36 to printer interface apparatus 21. For example, format generator 36 can send a control command requesting that a format generated with format generator 36 be passed directly to printer 39 via printer interface 34 without any translation occurring. This enables a user of format generator 36 to view an output image generated on printer 39. Alternately, format generator 36 can send a control command directing CPU 30 to store a format generated on format generator 36 to first memory 25 for use with a subsequent unformatted data stream from host computer 37.

CPU 30 can also perform a hard copy hex dump of unformatted data sent from host computer 37, or of data received remotely via modem interface 32. CPU 30 can also allow a direct link to printer interface 34 from host computer 37 or modem interface 32, without attempting to format the stream of data. CPU 30 can accept and store date and time information in an optional clock/timer integrated circuit.

Figure 2:
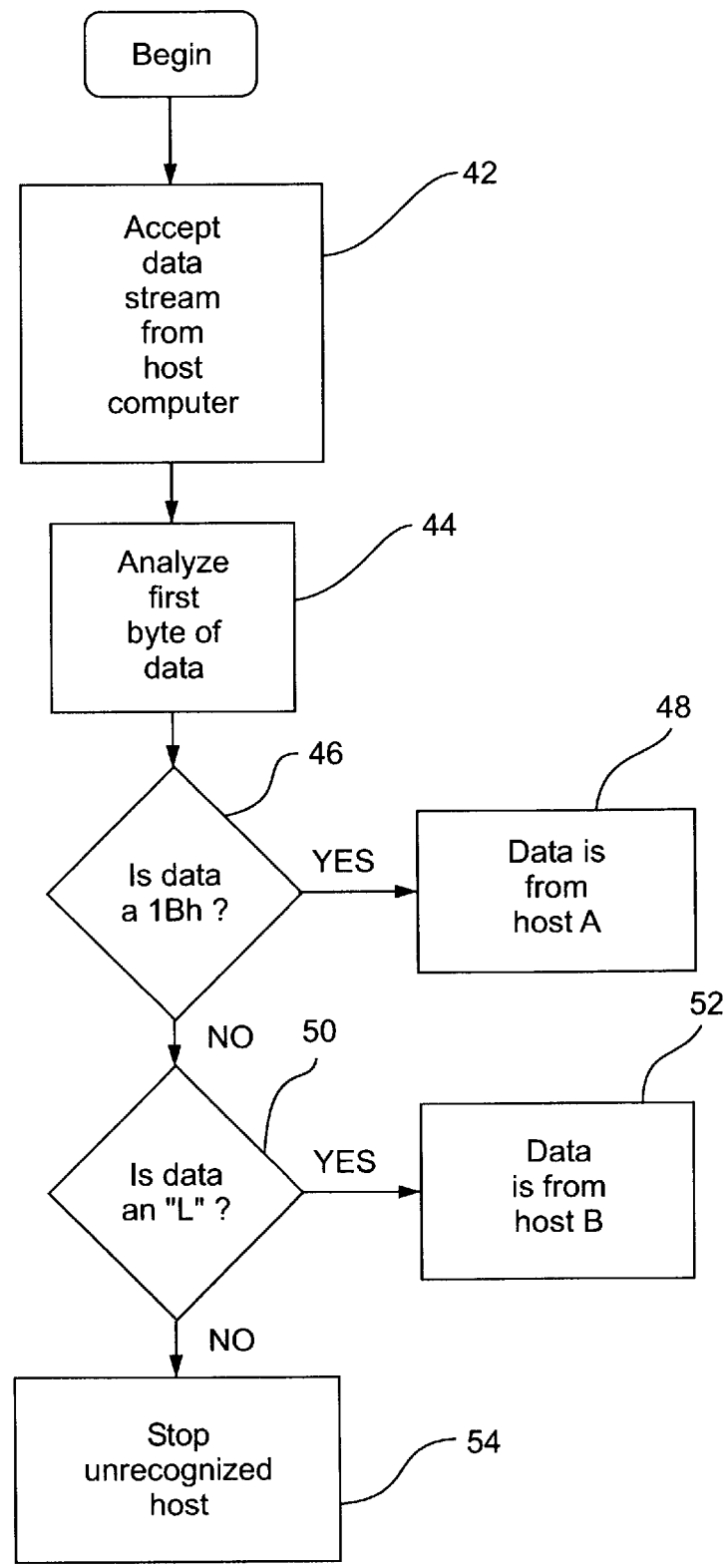
FIG. 2 is a flow diagram showing a process for determining which of a plurality of computers is the source of an unformatted stream of data communicated to a printer interface apparatus, according to one embodiment of this invention.

According to another embodiment of this invention, printer interface apparatus 21 can be coupled to a plurality of host computers 37. FIG. 2 is a flow diagram showing a process by which CPU 30 can analyze a stream of data received from one of a plurality of host computers 37 and determine which of the host computers has sent the stream of unformatted data. At block 42 of FIG. 2, CPU 30 receives the stream of unformatted data from one of the plurality of host computers 37. At block 44, CPU 30 analyzes a byte of data in the unformatted data stream. At block 46, CPU 30 determines whether the byte of data is a hex 1B and if it is, determines that the stream of unformatted data came from host A. Having recognized the source of the data, CPU 30 can determine the field layouts within the stream of unformatted data and can choose a specific group of formats stored in first memory 25 which are associated with host A. If at block 46 CPU 30 determines that the stream of data did not come from host A, then at block 50 CPU 30 compares the first byte of data to an "L". If the first byte equals an "L" then CPU recognizes that the unformatted data stream came from host B and can process the unformatted stream of data with the field layouts associated with host computer B. CPU 30 also can utilize this information to access a group formats in first memory 25 associated with host B. If at block 50 the first byte of data is not equal to an "L" then at block 54 CPU 30 stops because the host is unrecognized.

It is apparent that the particular patterns described are illustrative, and that other patterns, and other lengths of patterns could be utilized to determine which host computer 37 of a plurality of host computers 37 sent a stream of data. Moreover, although the flow diagram illustrated in FIG. 2 illustrates a particular pattern recognition algorithm for determining which computer of a plurality of host computers 37 sent an unformatted stream of data, it is apparent that other techniques known to those skilled in the art could be utilized to make such determination. For example, a particular length of a stream of unformatted data could uniquely identify it as originating from a particular host computer 37 of a plurality of host computers 37.

Figure 3:
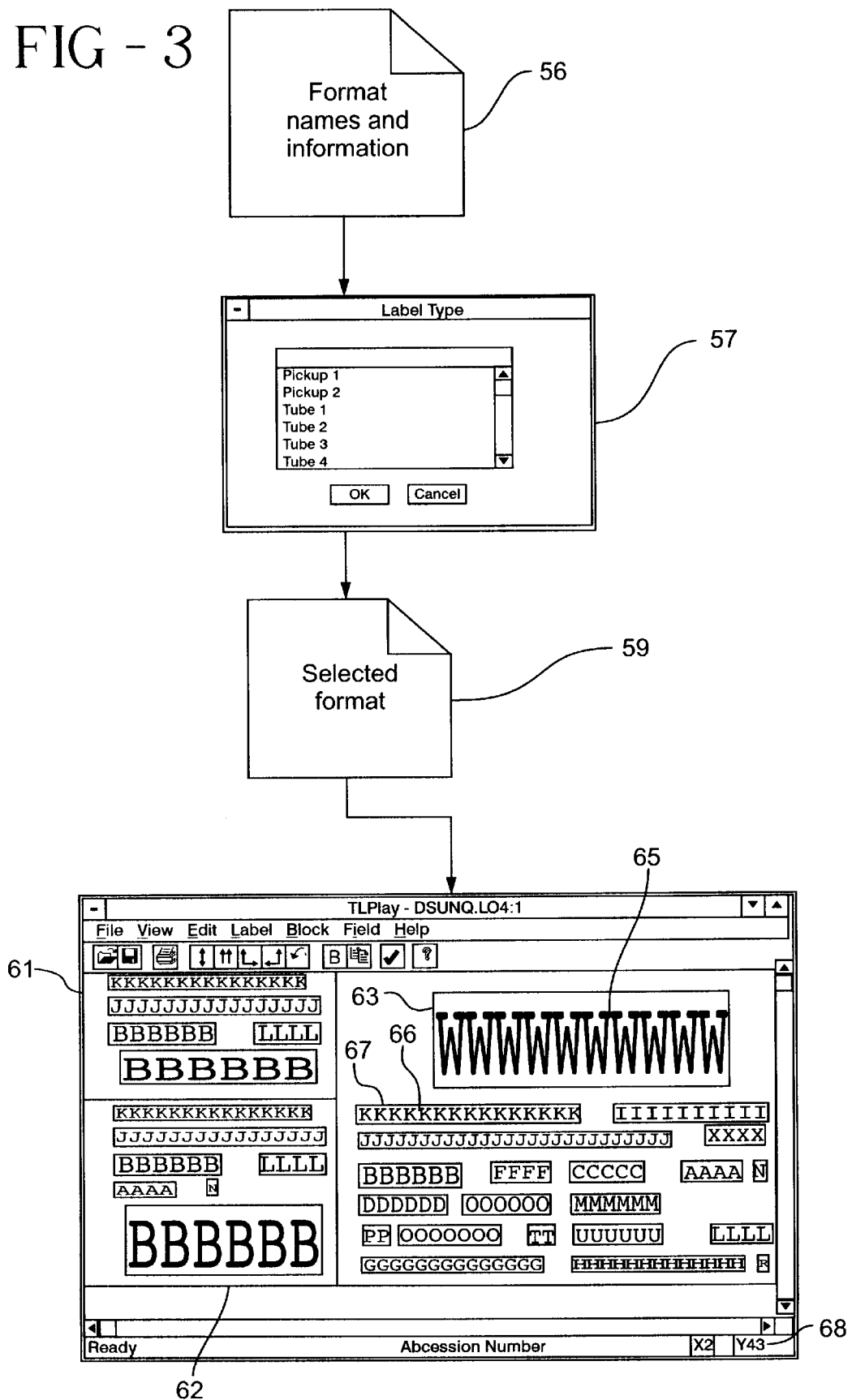
FIG. 3 is a flow diagram showing a process for selecting a format and displaying an image as a function of the format according to one embodiment of this invention.

FIG. 3 is a flow diagram illustrating one aspect of format generator 36 according to one embodiment of this invention. Format generator 36 can comprise a general purpose computer executing a computer program according to this invention which displays an image of a format on a display device, allows user manipulation of the image, and generates a new format as a function of the manipulated image. It is apparent that format generator 36 could also be implemented in a special purpose computer having specific circuitry to carry out the functionality described herein. According to one embodiment of this invention, format generator 36 contains an Intel compatible microprocessor, and runs the Microsoft Windows™ operating system.

Information file 56 is associated with a particular host computer 37, and contains a list of the names of preexisting formats which can be used with the particular host computer 37. Information file 56 also contains information regarding each format, including textual descriptions of each field of data which can be placed on a label, the field identifier names, filler characters to represent actual data on an image generated from the format, and paper stock information. Format generator 36 reads information file 56 and extracts the list of format names and other information regarding the formats. Format generator 36 generates and displays window 57 which contains the list of preexisting format names that can be selected by a user for modification. A user selects a particular format with a selection apparatus, such as a mouse, or a keyboard. Format generator 36 reads the particular format file 59 which is associated with the format name selected by a user in window 57.

For each field utilized by the particular format file 59 selected, format file 59 preferably contains a reference to the field information in information file 56. Format file 59 also contains the position and size information associated with each field utilized by the format, so that an image can be generated from format file 59. The actual formatting codes which determine a field's position and size are documented by the manufacturer of the printer with which format generator 36 and printer interface apparatus 21 will be used. Format generator 36 extracts from format file 59 the position and size information for each relevant field, and extracts any appropriate information from information file 56, such as a textual description of the field, and any filler data for use with the field, to generate an image for display as shown in window 61. The position and size of the data fields on format image 62 are substantially the same as the position and size of the data fields of an image generated on the appropriate output device from the same information in format file 59. However, for ease of user manipulation, format image 62 may be proportionally larger than an image generated on the appropriate output device such as printer 39. Thus, a user can easily envision how any changes to format image 62 will be reflected in the actual output image generated on the output device.

For example, as shown in image 62, field 63 contains filler data 65 which has a significantly greater height than filler data 66 in field 67. Likewise, on an image generated from the information in format file 59 on the appropriate output device, such as printer 39, the data in field 63 will have a significantly greater height than the data in field 67. The filler data used on format image 62 is used to represent the field's relative position and size, and not necessarily the actual type of data within the field. For example, when generated on an output image on an output device, the data in field 63 may be bar code information rather than alphanumeric information.

Format generator 36 allows a user to position a cursor over a field shown on image 62, such as field 63 or field 67, and allows the user to "drag" the selected field from one location on format image 62 to another location on format image 62. Format generator 36 recognizes such user manipulation of format image 62 and generates a new format file which contains formatting codes reflecting the new format image 62, such that an image generated on an output device from information in the new format file would appear substantially the same as the new format image 62.

Format generator 36 also allows a user to rotate a selected data field to a vertical position and identify a particular orientation of the data within the vertical data field. As a user passes a cursor over a particular field, such as field 67, format generator 36 can display a field identifier name such as 'Accession Number' on status bar 68 of window 61 so the user knows what information filler data 66 represents. Format generator 36 can also allow a user to add data fields to format image 62 which do not initially appear on format image 62. Such data fields can either be data fields described in information file 56 but not utilized on format image 62, or can be descriptive text created by the user. Another feature of format generator 36 includes the ability to select a particular type of paper stock for use on the output device which will ultimately utilize the new format file generated by format generator 36. Format generator 36 can also allow a user to delete data fields from format image 62. Several of these features will be discussed in more detail below.

Figure 4:
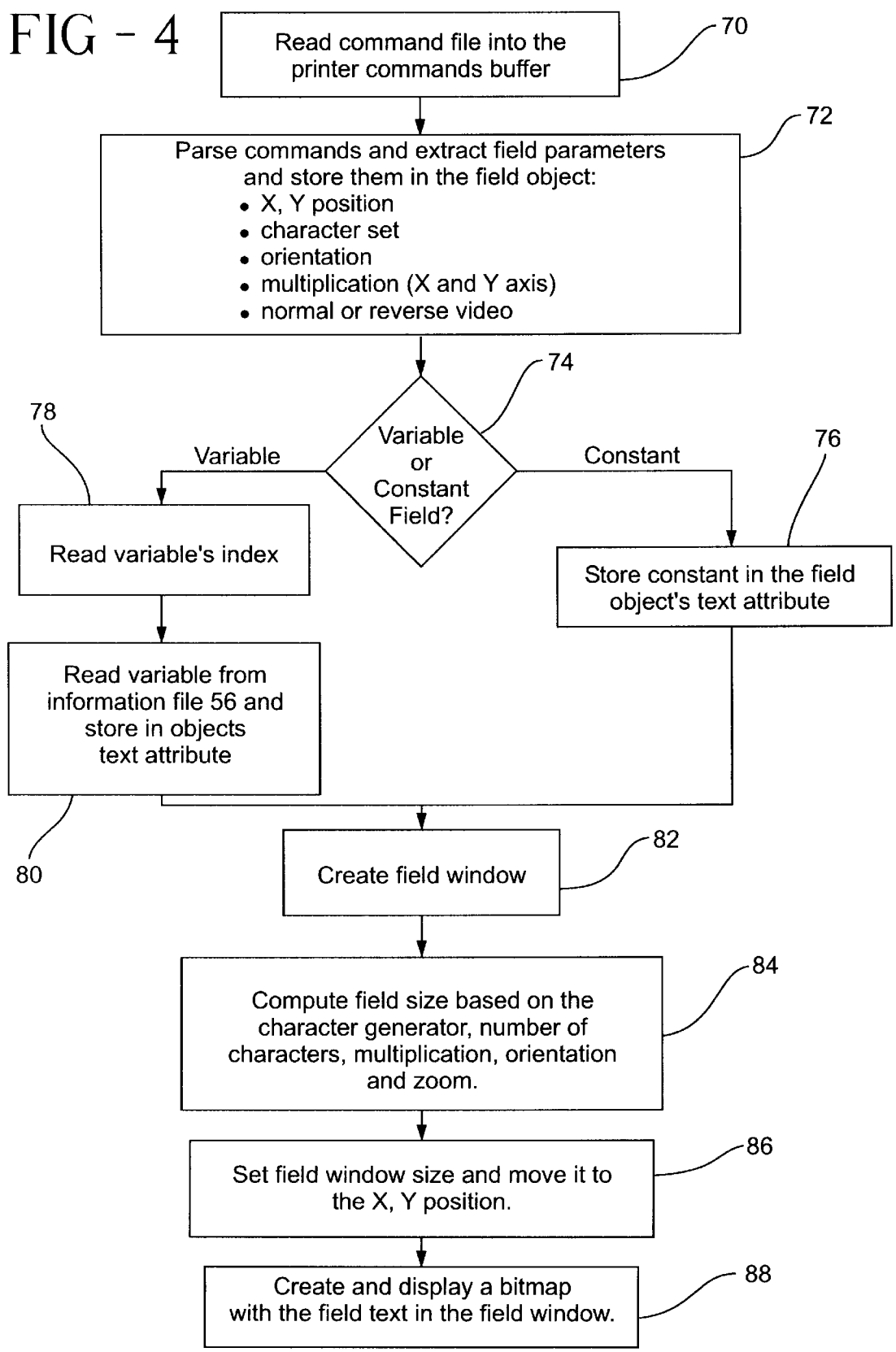
FIG. 4 is a flow diagram showing a process for translating formatting codes into a bitmapped image according to one preferred embodiment of this invention.

FIG. 4 is a flow diagram showing one process by which format generator 36 can generate format image 62 from the formatting codes within format file 59. It is apparent that while format file 59 is described for convenience as a file, the formatting codes which compose format file 59 could be extracted from a database, or could exist solely in a memory of format generator 36 after having been received over a network or other input port. According to one embodiment of this invention, format generator 36 can be coupled to printer interface apparatus 21 and send an appropriate control signal to printer interface apparatus 21 requesting printer interface apparatus 21 to communicate one or more of the formats within first memory 25 to format generator 36. In this manner, format generator 36 can allow generation of new formats, as described herein, directly from the current formats currently stored in printer interface apparatus 21.

FIG. 4 assumes that each data field displayed on format image 62 is represented by a corresponding field object in a particular computer programming language. While FIG. 4 describes a process implemented in an object oriented computer language, it is apparent that the same functionality could be achieved in non-object oriented computer languages. At block 70, format generator 36 reads the formatting codes in format file 59 into a memory within format generator 36. At block 72, format generator 36 parses the formatting codes and stores them in attributes associated with the particular field object. Such attributes include the X, Y position of the data field, the particular printer character set, the orientation of the data field, a multiplication factor of the data field, and whether it will be displayed in normal or reverse video.

At block 74, format generator 36 determines whether the particular field is a variable or a constant. If it is a variable, then the actual data displayed in this field on an image generated by an output device will come from a stream of data sent from host computer 37, as shown in FIG. 1. Thus, the data varies depending on the stream of data sent from host computer 37. If the field is a constant, the actual data comes from format file 59, and the data remains the same on each image generated from format file 59. If the field is a constant, then at block 76, format generator 36 stores the constant value in the field object's text attribute. If it is a variable, then at block 78, format generator 36 extracts from format file 59 the reference for this field to information file 56, and obtains from information file 56 filler data used to represent this particular variable, and stores the filler data in the field object's text attribute.

At block 82, format generator 36 creates a window for the field. At block 84, format generator 36 computes the size of the field based on the character set, the number of characters, the multiplication factor, the orientation, and the zoom factor. At block 86, format generator 36 sets the field window size and moves it to the appropriate X, Y position. At block 88, format generator 36 creates and displays a bitmap with the field text in the field window. This process is repeated for each data field associated with format image 62. In this way, format image 62 can be generated from format file 59.

Figure 5:
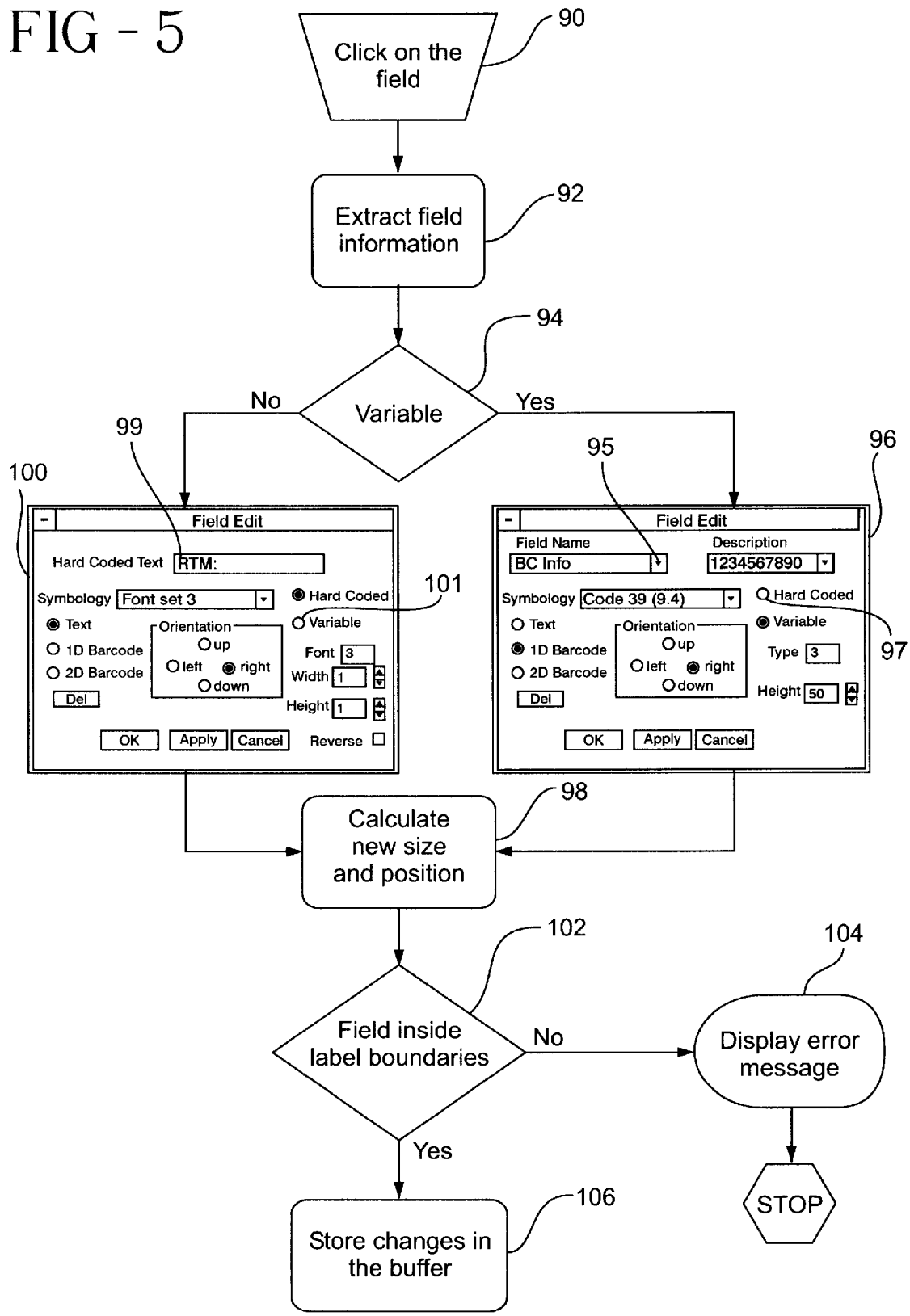
FIG. 5 is a flow diagram showing a process for enabling modification of a data field on an image, according to one embodiment of this invention.

FIG. 5 is a flow diagram illustrating another aspect according to this invention. At block 90, a user activates, such as by clicking a mouse, a data field such as field 63 (FIG. 3). At block 92, format generator 36 extracts data field information associated with the user activated data field from the field object associated with the data field. At block 94, format generator 36 determines whether the particular field is a variable or a constant. If a variable, then variable edit box 96 is displayed. As shown in FIG. 5, variable edit box 96 can allow a user to specify a particular height and orientation of the field, a particular character set, and even a new field name if desired. For example, if a user activates button 95, format generator 36 displays a list of all field identifier names available for use with this particular format. The list of such field identifier names can come from information file 56, as described previously. The user can select one of the listed field identifier names to modify what information the activated data field will comprise. For example, if the activated data field previously comprised patient name information, the user could select the physician name identifier such that the field now comprises physician name information. The user can also convert a variable data field to a constant data field by selecting button 97. In this event, format generator 36 will display a new edit box which would resemble constant edit box 100.

If the data field is a constant, then format generator 36 can display constant edit box 100. Constant edit box 100 is similar to variable edit box 96 and enables user modification of the data field's width, height, orientation, and font set, among other characteristics. A user can enter the desired constant text in text field 99. This text will then be gene rated on each output label generated from this format. A user can also change this constant data field into a variable data field by activating button 101, in which event format generator 36 will display an edit box similar to variable edit box 96. After the user activates the 'OK' button associated with constant edit box 100 or variable edit box 96, as appropriate, format generator 36 at block 98 calculates the new size and position of the data field as a function of the changes made to the data field by the user. At block 102, format generator 36 determines if the data field will remain within the boundaries of format image 62. If the modified data field lies outside the boundaries of format image 62, then at block 104 format generator 36 displays an error message. If the modified data field remains within the boundaries of format image 62, then at block 106 format generator 36 generates the appropriate formatting codes which will reflect the new modified format image 62, and stores the new formatting codes in format file 59, or a memory buffer.

Figure 6:
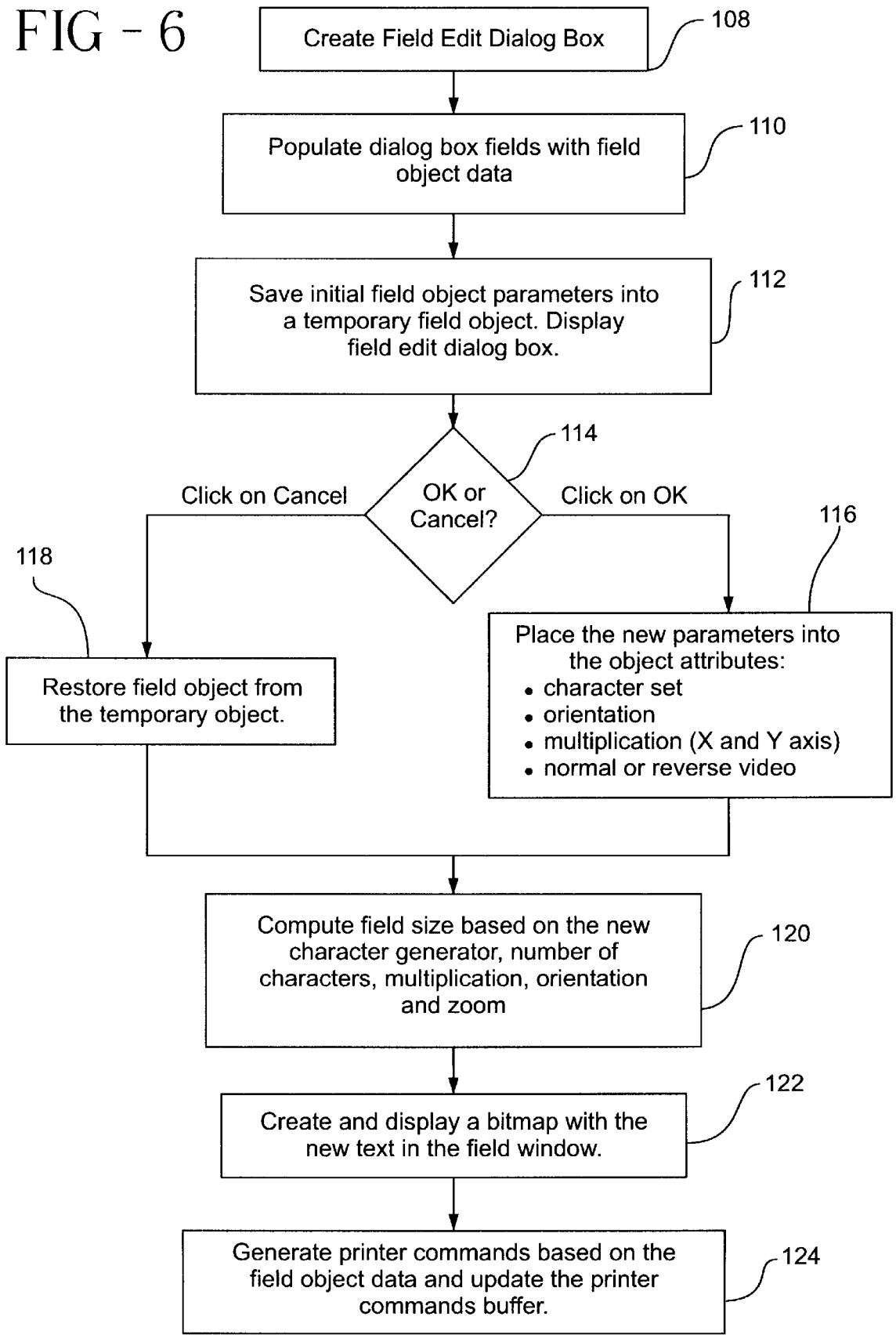
FIG. 6 is a flow diagram showing the translation from a modified image to specific formatting codes, according to one embodiment of this invention.

FIG. 6 is a more detailed flow diagram illustrating how the process shown in FIG. 5 can be carried out according to one embodiment of this invention. Upon user activation of a data field, format generator 36 at block 108 creates a field edit dialog box such as variable edit box 96 or constant edit box 100 as illustrated in FIG. 5, prefills the fields within the edit box with the appropriate field information from the field object associated with the activated data field, saves the field information in a temporary field object, and displays the edit box. After a user makes the desired changes to the data field via the edit dialog box, the 'OK' button or the 'CANCEL' button is activated by the user. If the 'CANCEL' button is activated, then at block 118 the attributes of the field object associated with the activated data field are restored from the temporary field object created at block 112. If the 'OK' button is activated, then at block 116 format generator 36 determines which parameters have been changed by the user and places those parameters into the attributes of the field object associated with the data field activated. At block 120, format generator 36 computes the new field size based on the new character set, number of characters, multiplication factor, orientation and zoom factor. At block 122, format generator 36 creates and displays a bitmap reflecting the new field image as manipulated by the user. At block 124, new formatting codes are generated which will reflect the data field as it has been manipulated by the user. These formatting codes are stored in a printer command buffer within format generator 36 or in format file 59.

Figure 7:
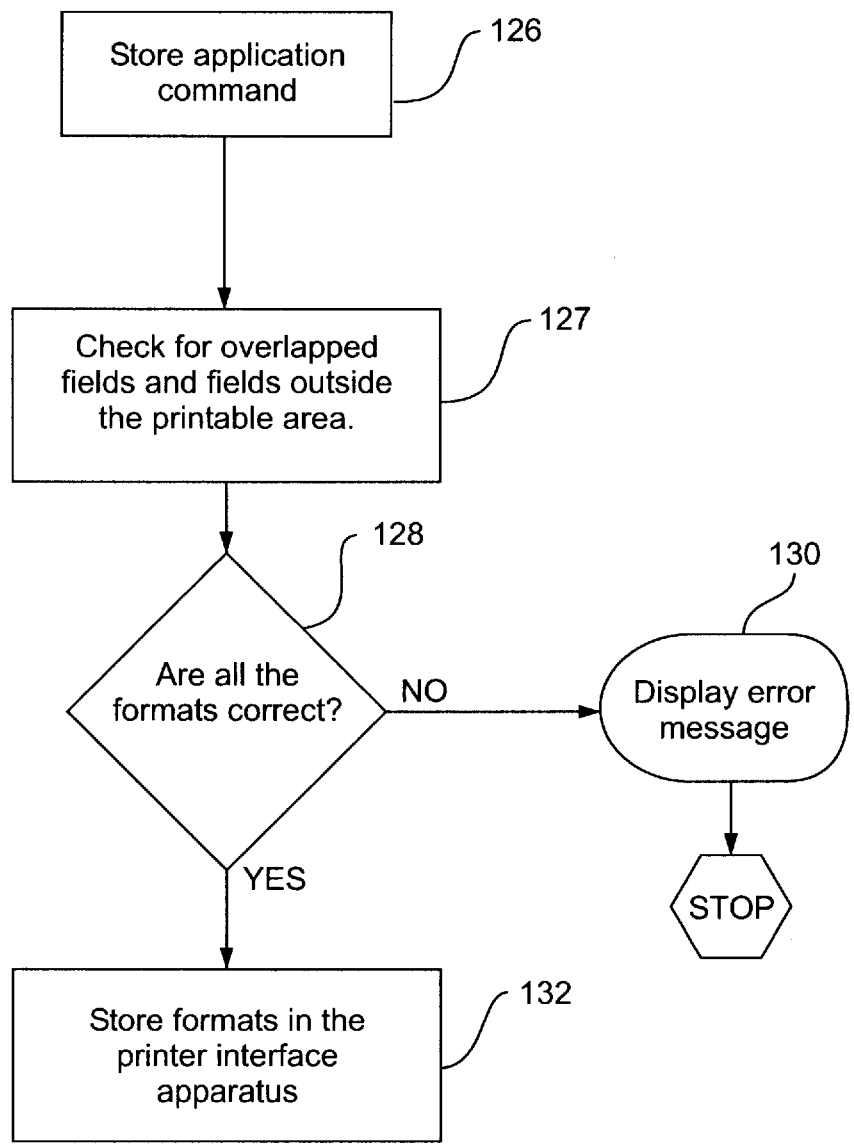
FIG. 7 is a flow diagram showing a process by which the format generator according to this invention can store a new format in the printer interface apparatus according to this invention.

FIG. 7 is a flow diagram showing the process by which format generator 36 can store a new format generated by format generator 36 in printer interface apparatus 21. At block 126, format generator 36 recognizes that a user has requested that a format be stored in printer interface apparatus 21. According to one embodiment of this invention, when format generator 36 determines that a new format should be stored in printer interface apparatus 21, format generator 36 communicates all formats associated with that particular output device to printer interface apparatus 21. At block 127, format generator 36 ensures that all data fields of the new format are within the boundaries of format image 62. At block 128, format generator 36 cycles through each format associated with the particular output device whose formats will be downloaded to printer interface apparatus 21, and ensures that the data fields of each format lie within the boundaries of the format, and do not overlap one another. If a format is incorrect, then at block 130 format generator 36 displays an error message and stops. If all formats are correct, at block 132 format generator 36 sends the formats associated with a particular output device to printer interface apparatus 21.

Printer interface apparatus 21 receives the formats sent by format generator 36 and stores the formats in first memory 25, as shown in FIG. 1. Printer interface apparatus 21 then utilizes the new format in first memory 25 with a subsequent stream of unformatted data sent from host computer 37.

According to another embodiment of this invention, format generator 36 communicates only the new format to printer interface apparatus 21 rather than all formats associated with the particular output device.

Communication between printer interface apparatus 21 and format generator 36 is accomplished, according to one embodiment of this invention, by control fields within a header created and communicated by format generator 36 to printer interface apparatus 21. For example, if a user of format generator 36 wishes to print an output image on printer 39 from a format which the user is modifying, format generator 36 creates a header containing a control code informing CPU 30 of printer interface apparatus 21 to route the data from format generator 36 directly to printer 39 without applying any formatting instructions to the stream of data. In this event, format generator 36 will communicate the header information, the format containing the formatting codes which represent the display image on the display device, and data for use with the format. CPU 30 will receive the header and recognize that it is to pass the format and the data directly to printer 39 without applying any translation instructions to the data. A user can then examine the output image generated on printer 39 and determine whether the format they have designed meets their requirements.

If the user decides that the format he has created on format generator 36 should be stored in printer interface apparatus 21 to be utilized with subsequent streams of data from host computer 37, a user can select the STORE option of format generator 36. Format generator 36 recognizes user activation of the STORE option and creates a header containing a control code which directs CPU 30 to store the format which is being passed to CPU 30 in first memory 25.

Figure 8:
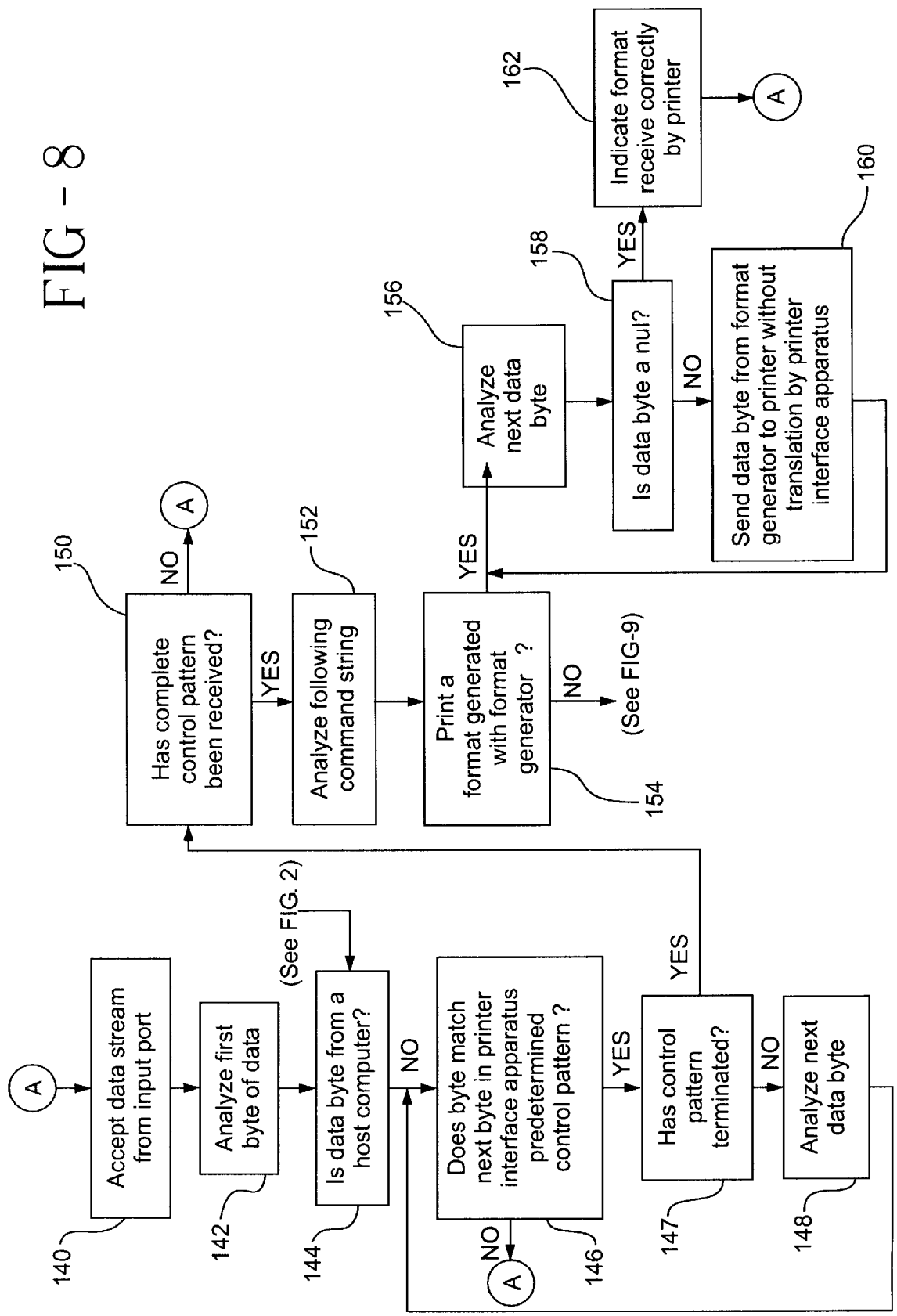
FIGS. 8 and 9 are flow diagrams showing a process by which the format generator according to this invention can communicate with the printer interface apparatus according to this invention.
Figure 9:
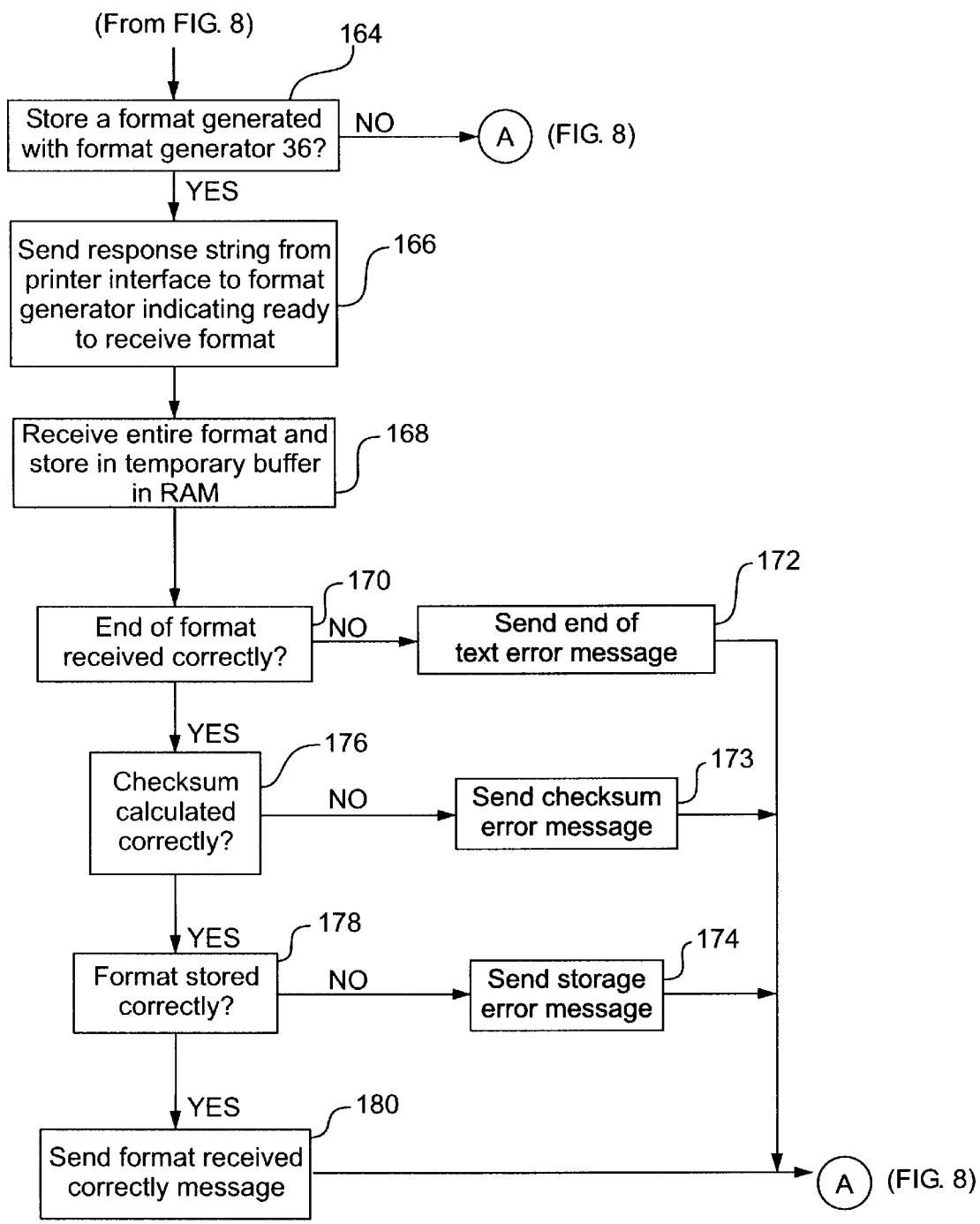

FIGS. 8 and 9 are flow diagrams showing a process by which format generator 36 can communicate with printer interface apparatus 21. At block 140 of FIG. 8, printer interface apparatus 21 accepts a data stream from serial interface 28, to which a device such as format generator 36 is coupled. At block 142, printer interface apparatus 21 analyzes the first byte of data and at block 144 determines whether host computer 37 sent the data stream, as described above with reference to FIG. 2. If the data stream did not come from host computer 37, then at blocks 146, 147 and 148, printer interface apparatus 21 performs pattern matching by comparing a series of bytes of data to determine if the stream of data contains a predetermined control pattern which informs printer interface apparatus 21 that a command string follows the predetermined control pattern. At block 146, if a byte of data in the data stream does not match the next byte in the predetermined control pattern, control returns to block 140. If an indication that the predetermined control pattern is terminated is received, such as by receipt of a null character, then at block 150, printer interface apparatus 21 determines whether the complete predetermined control pattern has been received. If not, control returns to block 140.

If a complete control pattern has been received, then at block 152 printer interface apparatus 21 analyzes the command string following the predetermined control pattern. At block 154, printer interface apparatus 21 determines whether the command is a print format command directing printer interface apparatus 21 to pass the accompanying format generated by format generator 36 to printer 39. If the command is a print format command, then at blocks 156, 158 and 160 printer interface apparatus 21 sends the format to printer 39 until a terminator byte, such a null character is received. At block 162 printer interface apparatus 21 then communicates to serial interface 28 that the format was successfully sent to printer 39.

If at block 154 printer interface apparatus 21 determines that the command is not a print format command, then at block 164 of FIG. 9 printer interface apparatus 21 determines whether the command is a store format command. If the command is a store format command then at block 166 printer interface apparatus 21 sends a signal to format generator 36 that printer interface apparatus 21 is ready to receive the format. At block 168 printer interface apparatus 21 receives the format and stores it in a temporary memory such as RAM 22. At blocks 170, 176 and 178 printer interface apparatus 21 verifies that the format was received correctly, that the checksum was correct, and that the format was stored in a memory such as first memory 25 correctly. If any of the verifications at blocks 170, 176 or 178 fail, printer interface apparatus 21 sends an appropriate error signal to format generator 36. Otherwise, at block 180 printer interface apparatus 21 communicates to format generator 36 that the format was received and stored correctly.

Printer interface apparatus 21 according to one embodiment of this invention can also respond to other commands from an external signal, including saving formatting instructions in second memory 27, changing the data and time of optional clock circuitry, changing serial communications parameters, initiating a phone call to the vendor, and bypassing translation mode and connecting serial interface 28 directly with modem interface 32.

The foregoing description of a preferred embodiment invention has been presented for purposes of illustration and description. It is not intended to be exhaustive or to limit the invention to the precise form disclosed. Obvious modifications or variations are possible in light of the above teachings. The embodiment was chosen and described in order to best illustrate the principals of the invention and its practical application to thereby enable one of ordinary skill in the art to best utilize the invention in various embodiments and with various modifications as are suited to the particular use contemplated. It is intended that the scope of the invention be defined by the claims appended hereto.

We claim:

1. A system for controlling the generation of an output image on a printer, comprising:
   a printer interface apparatus adapted to be coupled to a computer, the printer interface apparatus comprising:
      a communications port for receiving a stream of data from the computer;
      a first memory having stored therein at least one format comprising formatting codes for defining an output image on a printer;
      a second memory having stored therein first instructions for formatting the stream of data for use with the at least one format;
      a processor coupled to the first memory and the second memory, the processor being operative to execute the first instructions in the second memory and to format the stream of data for use with the at least one format in the first memory, thereby generating a stream of formatted data; and
   a format generator apparatus operative to be coupled to the printer interface, the processor being operative to receive a new format from the format generator apparatus and operative to store the new format in the first memory.

2. A system according to claim 1, wherein the format generator apparatus further comprises a display device, the format generator apparatus being operative to display an image of a format on the display device, the format generator apparatus being operative to enable a user to modify data fields from the image of the format to generate a new image, and the format generator apparatus being operative to generate a new format from the new image and download the new format to the processor for storage of the new format in the first memory.

3. A system according to claim 1, wherein the printer interface apparatus is adapted to be coupled to a plurality of computers, the communications port is capable of receiving the stream of data from any of the plurality of computers, and wherein the processor is operative to determine from the stream of data a source computer, the source computer being one of the plurality of computers sending the stream of data.

4. A system according to claim 3, wherein the first memory has stored therein a plurality of groups of formats, each group being associated with one of the plurality of computers, and wherein the processor is operative to determine which of the groups of formats is associated with the source computer, and operative to select the at least one format from the group of formats associated with the source computer.

5. A system according to claim 1, wherein a same physical memory comprises the first memory and the second memory.

6. A system according to claim 1, wherein the first memory is capable of retaining the first format upon a loss of power to the printer interface apparatus.

7. A system according to claim 1, wherein the second memory is capable of retaining the first instructions upon a loss of power to the printer interface apparatus.

8. A system according to claim 1, wherein the processor is operative to receive second instructions from an external signal, and operative to store the second instructions in the second memory.

9. A system according to claim 1, wherein the first memory has stored therein at least two formats, the processor being operative to determine from the stream of data which of the at least two formats to apply to the stream of data.

10. A printer interface apparatus for formatting a stream of data, comprising:
    a communications port for receiving a stream of data from one of a plurality of computers;
    a first memory having stored therein at least one format comprising formatting codes for defining an output image on a printer, the first memory capable of retaining the at least one format upon a loss of power to the printer interface apparatus;
    a second memory having stored therein first instructions for formatting the stream of data, the second memory capable of retaining the first instructions upon a loss of power to the printer interface apparatus;
    a processor coupled to the first memory and the second memory, the processor being operative to execute the first instructions in the second memory and to format the stream of data for use with the at least one format in the first memory, thereby generating a stream of formatted data; and
    the processor being operative to determine from the stream of data a source computer, the source computer being one of the plurality of computers of sending the stream of data.

11. A printer interface apparatus according to claim 10, wherein the first memory has stored therein a plurality of groups of formats, each group associated with one of the plurality of computers, and wherein the processor is operative to determine which of the groups of formats is associated with the source computer, and is operative to select the at least one format from the group of formats associated with the source computer.

12. A printer interface apparatus according to claim 10, wherein the processor is operative to receive second instructions from an external signal, and operative to store the second instructions in the second memory.

13. A printer interface apparatus according to claim 10, wherein a same physical memory comprises the first memory and the second memory.

14. A printer interface apparatus according to claim 10, further comprising a modem interface, the processor coupled to the modem interface, the processor being operative to receive a second format via the modem interface and operative to store the second format in the first memory.

15. A printer interface apparatus according to claim 14, wherein the processor is operative to receive second instructions via the modem interface and operative to store the second instructions in the second memory.

16. A printer interface apparatus according to claim 14, wherein the processor is operative to be controlled by an external computer via the modem interface.

17. A printer interface apparatus according to claim 10, further comprising a modem interface, the processor coupled to the modem interface, the processor being operative to receive second instructions via the modem interface and operative to store the second instructions in the second memory.

18. A printer interface apparatus according to claim 10, wherein the processor is operative to receive an external signal comprising a second format, and operative to store the second format in the first memory.

19. A printer interface apparatus according to claim 18, further comprising a format generator apparatus adapted to be coupled to the processor, wherein the format generator apparatus communicates the external signal comprising the second format to the processor.

20. A printer interface apparatus according to claim 19, wherein the format generator apparatus further comprises a display device, the computer being operative to display an image of the at least one format on the display device, the computer being operative to enable a user to modify data fields from the image of the at least one format to generate a new image, and the computer being operative to generate the second format from the new image.

21. A printer interface apparatus according to claim 10, wherein the first memory further comprises at least two formats, the processor operative to determine from the stream of data which of the at least two formats to apply to the stream of data.

* * * * *